(12) United States Patent
Hasegawa et al.

(10) Patent No.: US 11,015,974 B2
(45) Date of Patent: May 25, 2021

(54) MEASUREMENT DEVICE

(71) Applicant: NABTESCO CORPORATION, Tokyo (JP)

(72) Inventors: Koji Hasegawa, Tokyo (JP); Takashi Toyoda, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 369 days.

(21) Appl. No.: 16/074,508

(22) PCT Filed: Jan. 31, 2017

(86) PCT No.: PCT/JP2017/003293
§ 371 (c)(1),
(2) Date: Aug. 1, 2018

(87) PCT Pub. No.: WO2017/135211
PCT Pub. Date: Aug. 10, 2017

(65) Prior Publication Data
US 2019/0041262 A1 Feb. 7, 2019

(30) Foreign Application Priority Data
Feb. 3, 2016 (JP) .............................. JP2016-019313

(51) Int. Cl.
*G01J 3/02* (2006.01)
*G01J 3/50* (2006.01)
*G08C 25/00* (2006.01)
*H04Q 9/00* (2006.01)

(52) U.S. Cl.
CPC ............... *G01J 3/027* (2013.01); *G01J 3/50* (2013.01); *G08C 25/00* (2013.01); *H04Q 9/00* (2013.01); *H04Q 2209/86* (2013.01)

(58) Field of Classification Search
CPC . G01J 3/027; G01J 3/50; G08C 25/00; H04Q 2209/86; H04Q 9/00
USPC .......... 702/127, 183; 341/120, 155; 347/229
See application file for complete search history.

(56) References Cited

U.S. PATENT DOCUMENTS

| 5,754,214 A | * | 5/1998 | Okino | ...................... B41J 2/473 347/229 |
| 2007/0252744 A1 | * | 11/2007 | Takeuchi | ............ H03M 1/1076 341/155 |

FOREIGN PATENT DOCUMENTS

JP 2015-161601 A 9/2015

OTHER PUBLICATIONS

English translation, International Preliminary Report on Patentability and Written Opinion of the International Searching Authority issued in PCT/JP2017/003293 dated Aug. 7, 2018.
International Search Report PCT/JP2017/003293 dated Apr. 18, 2017 with English translation.

* cited by examiner

*Primary Examiner* — John H Le
(74) *Attorney, Agent, or Firm* — Pillsbury Winthrop Shaw Pittman, LLP

(57) ABSTRACT

A measurement device includes: a sensor for sensing a condition of an object to be measured; a plurality of output lines L for outputting a sensing result of the sensor; and a control unit for applying voltages to the plurality of output lines based on the sensing result of the sensor. The control unit performs self-failure diagnosis and outputs a result of the self-failure diagnosis with a combination of the voltages applied to the plurality of output lines L.

6 Claims, 6 Drawing Sheets

| No. | L1 | L2 | L3 | L4 | Condition |
|---|---|---|---|---|---|
| 1 | 0 | 0 | 0 | 0 | No Abnormality |
| 2 | 0 | 0 | 0 | 5 | Abnormality in Temperature Output Circuit |
| 3 | 0 | 0 | 5 | 0 | Abnormality in B Output Circuit |
| 4 | 0 | 0 | 5 | 5 | Abnormality in LED |
| 5 | 0 | 5 | 0 | 0 | Abnormalilty in G Output Circuit |
| 6 | 0 | 5 | 0 | 5 | Abnormality in Power Source |
| 7 | 0 | 5 | 5 | 0 | Abnormality in Photodiode |
| 8 | 0 | 5 | 5 | 5 | Abnormaility in Temperature Sensor |
| 9 | 5 | 0 | 0 | 0 | Abnormality in R Output Circuit |
| 10 | 5 | 0 | 0 | 5 | Abnormality in Service Temperature |
| 11 | 5 | 0 | 5 | 0 | Abnormality of Oil Penetration into Casing |
| 12 | 5 | 0 | 5 | 5 | Reduced Amount of Light (Life) of LED |
| 13 | 5 | 5 | 0 | 0 | Not Assigned |
| 14 | 5 | 5 | 0 | 5 | Not Assigned |
| 15 | 5 | 5 | 5 | 0 | Not Assigned |
| 16 | 5 | 5 | 5 | 5 | Not Assigned |

Fig. 5

MEASUREMENT DEVICE

CROSS-REFERENCE TO RELATED APPLICATIONS

This application is the U.S. National Stage of PCT/JP2017/003293, filed Jan. 31, 2017, which in turn claims priority to Japanese Patent Application No. JP 2016-019313, filed Feb. 3, 2016. The contents of each of these applications are incorporated herein by reference in their entireties.

TECHNICAL FIELD

The present invention relates to a measurement device.

BACKGROUND

Some conventional pressure sensors have a self-diagnosis function (see, for example, Patent Literature 1). The self-diagnosis function disclosed in Patent Literature 1 is accomplished by a diagnosis means that performs self-diagnosis. When a resonant frequency of an introduction path through which a measurement medium is introduced to a pressure sensing element is outside a predetermined range of frequency, the diagnosis means determines that a foreign substance is adhered to the introduction path.

RELEVANT REFERENCES

Patent Literature

Patent Literature 1: Japanese Laid-Open Patent Publication No. 2015-161601

SUMMARY

The self-diagnosis function disclosed in Patent Literature 1 requires an effort of wiring, because it is provided with a signal line for transmitting a result of the self-diagnosis of the pressure sensor to the outside, in addition to a signal line for transmitting pressure signals. Further, in the case where a result of self-diagnosis is transmitted to the outside with a contact signal as in Patent Literature 1, it is necessary to increase the number of signal lines in accordance with the types of the transmitted contents, resulting in more effort required for wiring and a larger size of the sensor caused by the wiring. It is also possible to transmit the results of self-diagnosis with a signal including the results of self-diagnosis superposed together (e.g., by time division or frequency division) instead of using contact signals, but this method still requires a signal line. Further, it is also possible to superpose the results of self-diagnosis on a signal line for transmitting a pressure signal, but this method is subject to a problem that when the pressure signal is an analogue signal, the superposed signals of the results of self-diagnosis constitute a noise component that corrupts the pressure signal.

In view of the above, one object of the invention is to provide a measurement device that can output a plurality of failure diagnosis results without affecting the sensor signals.

The following describes means for solving the above-described problem and effects obtained thereby. A measurement device that solves the above problem comprises: a sensing unit configured to sense a condition of an object to be measured; a plurality of output lines for outputting a sensing result of the sensing unit and a control unit configured to apply voltages to the plurality of output lines based on the sensing result of the sensing unit, wherein the control unit performs self-failure diagnosis and outputs a result of the self-failure diagnosis with a combination of the voltages applied to the plurality of output lines.

With the above arrangement, a result of failure diagnosis can be output with the combination of voltages applied to the plurality of output lines, and therefore, it is possible to output multiple sorts of results of failure diagnosis without providing a signal line for outputting the result of the failure diagnosis.

In the above measurement device, it is preferable that the combination of the voltages is constituted by values outside a range of sensing values output during normal measurement operation. With the above arrangement, a result of failure diagnosis can be output using the values usually not used, and therefore, it is possible to output the result of the failure diagnosis without providing an additional signal line for outputting the result of the failure diagnosis.

In the above measurement device, it is preferable that the combination of the voltages is constituted by a minimum value and a maximum value of each of the output lines. With the above arrangement, the combination of the voltages is constituted by the minimum value and the maximum value of each of the output lines, and therefore, the number of sorts of the results of the failure diagnosis that can be output is two to the power of the number of the output lines.

In the above measurement device, it is preferable that the sensing unit senses color of the object, and the plurality of output lines correspond respectively to three primary colors of color information obtained by the sensing unit.

In the above measurement device, the output lines are used to output color information, and therefore, there is no need of providing an additional line for outputting the result of the failure diagnosis.

ADVANTAGES

According to the present invention, a plurality of failure diagnosis results can be output without affecting the sensor signals. Other aspects and advantages of the present invention will be apparent from the following description, together with the drawings showing examples of technical ideas of the present invention.

BRIEF DESCRIPTION OF THE DRAWINGS

FIG. 5 shows combinations of voltages output from the measurement device of the embodiment.

DESCRIPTION OF EXAMPLE EMBODIMENTS

Figure 1:
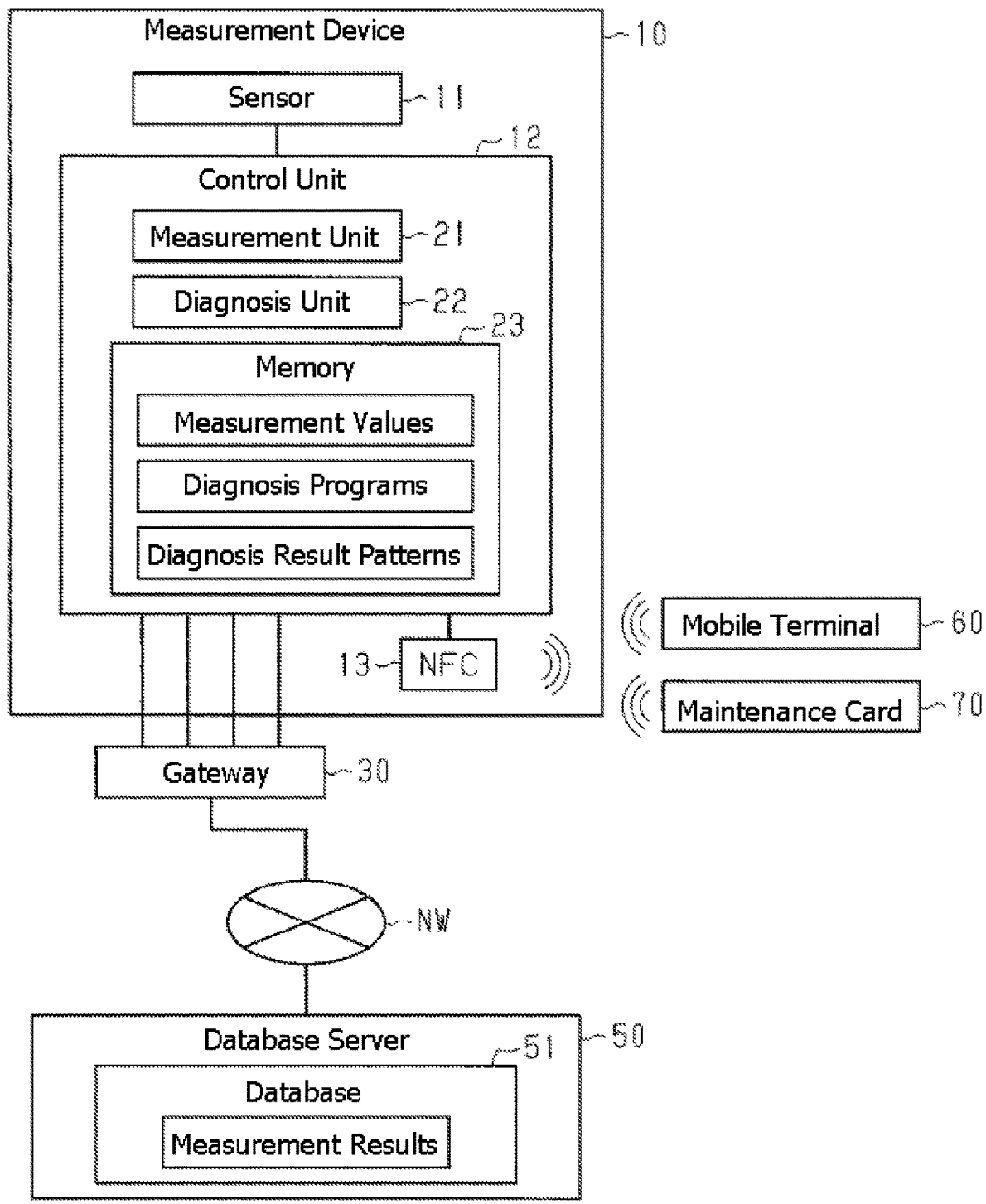
FIG. 1 is a block diagram schematically showing an embodiment of a measurement system having a measurement device.

One embodiment of a measurement device provided in a measurement system will be hereinafter described with reference to FIGS. 1 to 7. As shown in FIG. 1, the measurement system includes a measurement device 10 and a database server 50. The measurement device 10 measures conditions of an object to be measured (hereinafter referred to as "the object"), and the database server 50 connects with the measurement device 10 through a network NW. Examples of the network NW include public communication networks such as mobile telephone networks and public wireless LANs or private communication networks such as in-plant LANs and inter-plant WAN (Wide Area Network). The database server 50 includes a database 51. The database server 50 is connected with a plurality of measurement devices 10 through the network NW.

The measurement device 10 includes a sensor 11, a control unit 12, and a NFC 13. The sensor 11 serves as a sensing unit that senses the conditions of the object, the control unit 12 controls the sensor 11, and the NFC 13 performs short range wireless communication (e.g., NFC: Near Field Communication). The sensor 11 senses the conditions of the object and outputs to the control unit 12 the signals obtained by the sensing. The sensor 11 is a color sensor that outputs the color and the temperature of the object to the control unit 12. The NFC 13 performs short range wireless communication with an instrument that supports short range wireless communication. Examples of applicable short range wireless communication include DSRC (Dedicated Short Range Communications), specified low power radio, and weak radio, in addition to NFC having a communication range of about 10 cm. The NFC 13 performs authentication (terminal authentication) to determine whether a terminal with which to communicate is permitted for the short range wireless communication, based on information (ID, password, etc.) retained by and specific to the terminal once the terminal authentication succeeds, the NFC 13 sends and receives information to and from the terminal.

The control unit 12 includes a measurement unit 21 and a diagnosis unit 22. The measurement unit 21 measures the conditions of the object, and the diagnosis unit 22 performs failure diagnosis of the measurement device 10. The measurement unit 21 converts the signals input from the sensor 11 into measurement values. The diagnosis unit 22 performs various kinds of diagnosis and outputs results of the diagnosis. The control unit 12 is provided with a memory 23 serving as a storage unit. The control unit 12 performs the control through operation based on programs and parameters stored on the memory 23. The measurement unit 21 performs the measurement based on measurement programs stored on the memory 23 for measuring the conditions of the object. The diagnosis unit 22 performs diagnosis based on diagnosis programs and outputs results of the diagnosis based on diagnosis result patterns. The memory 23 stores the diagnosis programs and the diagnosis result patterns. The measurement unit 21 inputs the measurement values as measurement information to the memory 23 for storage.

The measurement device 10 connects with the network NW through a gateway 30. The gateway 30 connects between networks having different protocols. For example, the gateway 30 connects with the network NW in accordance with a wireless communication standard for connection with a public communication network such as a mobile telephone network. The gateway 30 can be mechanically attached to or detached from the control unit 12. The gateway 30 connects with the database server 50 through the network NW.

The measurement system includes a mobile terminal 60 that supports short range wireless communication and a maintenance card 70. The mobile terminal 60 is a smartphone, a tablet terminal, a mobile phone, a personal computer or the like that has a short range wireless communication function. The maintenance card 70 has a short range wireless communication function.

The mobile terminal 60 performs short range wireless communication with the NFC 13, and when the terminal authentication succeeds, the mobile terminal 60 fetches the measurement results from the measurement device 10, modifies the setting of the measurement device, or updates the information of the measurement device. The mobile terminal 60 has previously stored thereon programs for controlling the measurement device 10 through short range wireless communication.

The maintenance card 70 performs the terminal authentication with the NFC 13, and when the terminal authentication succeeds, the maintenance card 70 causes the measurement device 10 to perform a specific process programmed on the card. One example of the maintenance card 70 is a self-diagnosis card including a self-diagnosis request for causing the measurement device 10 to perform self-diagnosis.

The database server 50 accumulates, on the database 51, the measurement results fetched from the measurement device 10 through the network NW In response to a request from a user, the database server 50 provides the measurement results accumulated on the database 51 through the network NW. Further, the database server 50 performs Internet authentication with the gateway 30 through the network NW. The database server 50 and the measurement device 10 perform authentication with a password, and if the authentication succeeds, the database server 50 fetches the measurement results or other information. Further, the database server 50 and the mobile terminal 60 perform authentication with a password, and if the authentication succeeds, the database server 50 provides the measurement results or other information.

Figure 2:
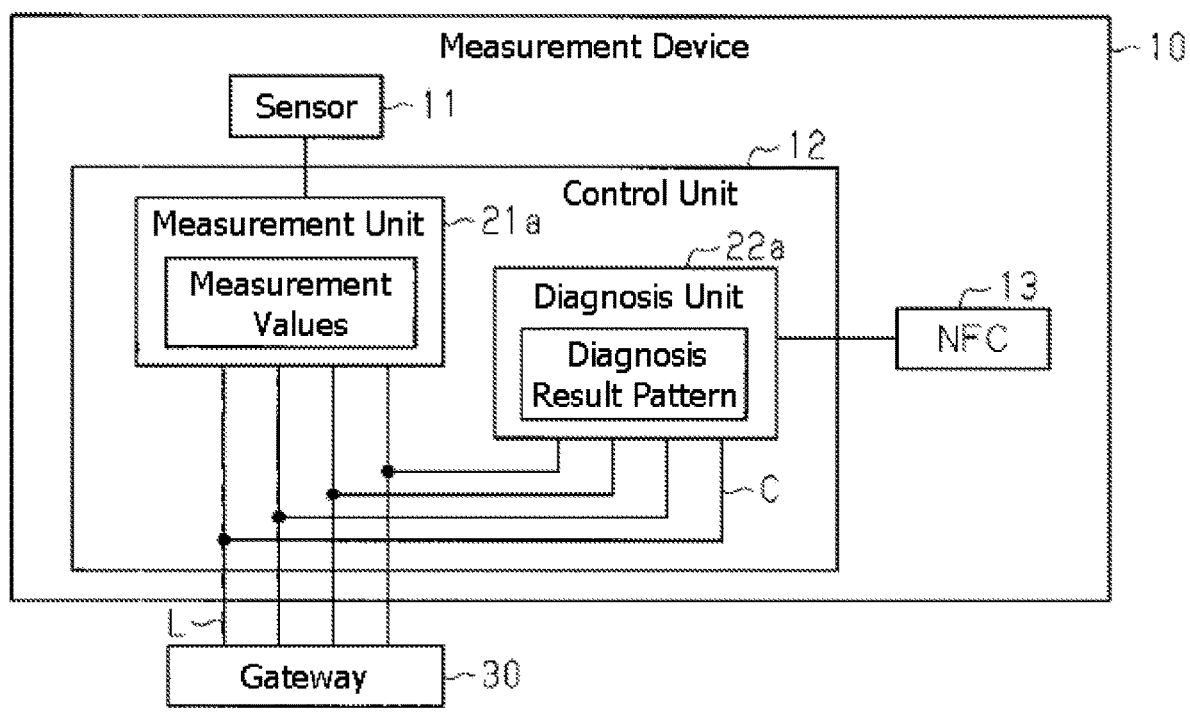
FIG. 2 is a block diagram schematically showing the measurement device of the embodiment.

Next, the internal configuration of the control unit 12 will be described. As shown in FIG. 2, the measurement unit 21 of the control unit 12 is connected with the sensor 11 and connected with the gateway 30 by a plurality of output lines L. The output lines L between the measurement unit 21 and the gateway 30 include three output lines that output voltages corresponding to an R value, a G value, and a B value of color information, respectively, and one output line that outputs a voltage corresponding to a temperature value. That is, the measurement unit 21 converts the color information and the temperature information into analogue voltages and outputs the analogue voltages to the gateway 30. The R value, the G value, and the B value refer to values of the three primary colors.

The diagnosis unit 22 of the control unit 12 is provided with a plurality of connection lines C connected to the output lines L between the measurement unit 21 and the gateway 30. When the connection portions at which the connection lines C connect with the output lines L receive inputs from the connection lines C, the voltages of the connection lines C are output to the gateway 30. For example, a multiplexer is provided at the connection portions at which the connection lines C connect with the output lines L. The diagnosis unit 22 performs diagnosis of the measurement device 10 and thereafter outputs voltages corresponding to the results of the diagnosis to the output lines L through the connection lines C.

Figure 3:
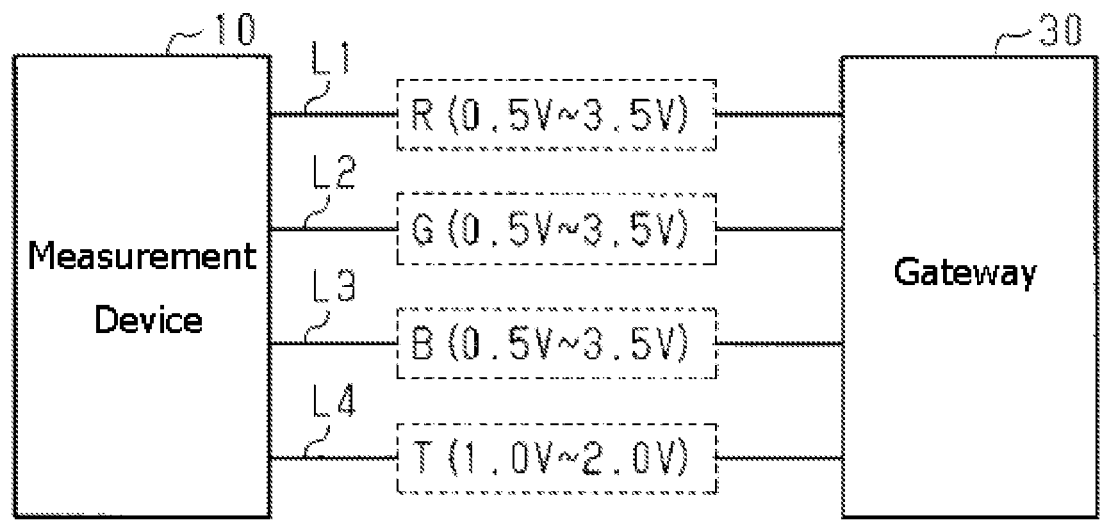
FIG. 3 shows voltages output during normal measurement operation performed by the measurement device of the embodiment.

As shown in FIG. 3, the four output lines L connecting between the measurement device 10 and the gateway 30 include a first output line L1, a second output line L2, and a third output line L3 for outputting color information and a four output line L4 for outputting a temperature. During the normal measurement operation, in which the measurement results of the sensor 11 are output, the first output line L1, the second output line L2, and the third output line L3 for outputting the color information are subjected to analogue voltages corresponding to the R value, G value, and B value of the color information each ranging from 0.5 to 3.5 V. Further, during the normal measurement operation, the fourth output line L4 for outputting a temperature is subjected to an analogue voltage corresponding to the temperature ranging from 1.0 V to 2.0 V.

Figure 4:
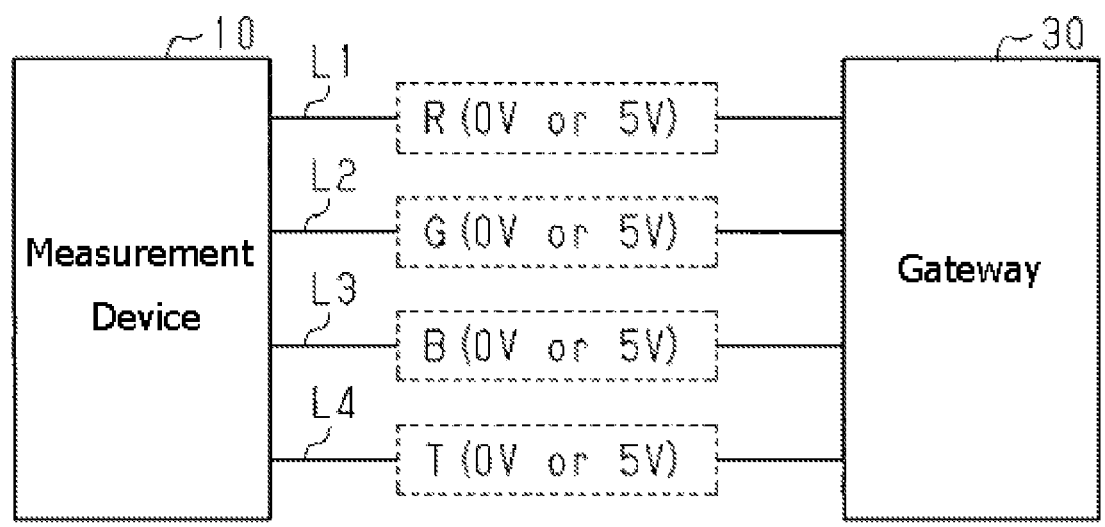
FIG. 4 shows voltages output during diagnosis result output operation performed by the measurement device of the embodiment.

As shown in FIG. 4, during the diagnosis result output operation, in which the results of the diagnosis of the measurement device 10 are output, the first output line L1, the second output line L2, and the third output line L3 for outputting the color information are selectively subjected to a voltage of 0 V or 5 V irrespective of the R value, G value, and B value of the color information. Further, during the diagnosis result output operation, the fourth output line L4 for outputting a temperature is selectively subjected to a voltage of 0 V or 5 V irrespective of the temperature. The voltages of 0 V and 5 V selected during the diagnosis result output operation are outside the range of the voltages output during the normal measurement operation (0.5 V to 3.5 V and 1.0 V to 2.0 V). That is, a combination of the voltages output during the diagnosis result output operation is constituted by values outside the range of the sensing values output during the normal measurement operation. The voltage of 0 V selected during the diagnosis result output operation is the minimum value of the output line L, and the voltage of 5 V selected during the diagnosis result output operation is the maximum value of the output line L.

As shown in FIG. 5, there are 16 combinations of the voltages indicating the diagnosis results of the measurement device 10, because each of the four output lines L has two values, making two to the power of four, or 16 combinations. Therefore, 16 sorts of diagnosis results can be output from the measurement device 10 to the gateway 30. The conditions of the measurement device 10 indicated by the combinations of the voltages are preset. The memory 23 stores the diagnosis result patterns that are the combinations of the voltages indicating the diagnosis results.

For example, the first combination of the voltages, in which all the output lines L1, L2, L3, and L4 are subjected to 0 V, indicates normality. The second combination of the voltages, in which the first output line L1, the second output line L2, and the third output line L3 are subjected to 0 V, and the fourth output line L4 is subjected to 5 V, indicates abnormality in a temperature output circuit. The third combination of the voltages, in which the first output line L1, the second output line L2, and the fourth output line L4 are subjected to 0 V, and the third output line L3 is subjected to 5 V, indicates abnormality in a B output circuit of the color information. The fourth combination of the voltages, in which the first output line L1 and the second output line L2 are subjected to 0 V, and the third output line L3 and the fourth output line L4 are subjected to 5 V, indicates abnormality in an LED. The fifth combination of the voltages, in which the first output line L1, the third output line L3, and the fourth output line L4 are subjected to 0 V, and the second output line L2 is subjected to 5 V, indicates abnormality in a G output circuit of the color information. The sixth combination of the voltages, in which the first output line L1 and the third output line L3 are subjected to 0 V, and the second output line L2 and the fourth output line L4 are subjected to 5 V, indicates abnormality in a power source. The seventh combination of the voltages, in which the first output line L1 and the fourth output line L4 are subjected to 0 V, and the second output line L2 and the third output line L3 are subjected to 5 V, indicates abnormality in a photodiode. The eighth combination of the voltages, in which the first output line L1 is subjected to 0 V, and the second output line L2, the third output line L3, and the fourth output line L4 are subjected to 5 V, indicates abnormality in a temperature sensor. The ninth combination of the voltages, in which the second output line L2, the third output line L3, and the fourth output line L4 are subjected to 0 V, and the first output line L1 is subjected to 5 V, indicates abnormality in an R output circuit of the color information. The tenth combination of the voltages, in which the second output line L2 and the third output line L3 are subjected to 0 V, and the first output line L1 and the fourth output line L4 are subjected to 5 V, indicates abnormality in a service temperature. The eleventh combination of the voltages, in which the second output line L2 and the fourth output line L4 are subjected to 0 V, and the first output line L1 and the third output line L3 are subjected to 5 V, indicates abnormality of oil penetration into the casing. The twelfth combination of the voltages, in which the second output line L2 is subjected to 0 V, and the first output line L1, the third output line L3, and the fourth output line L4 are subjected to 5 V, indicates a reduced amount of light (life) of an LED. In the embodiment, the thirteenth to sixteenth combinations of the voltages have no failure conditions assigned thereto but may have any conditions assigned.

Figure 6:
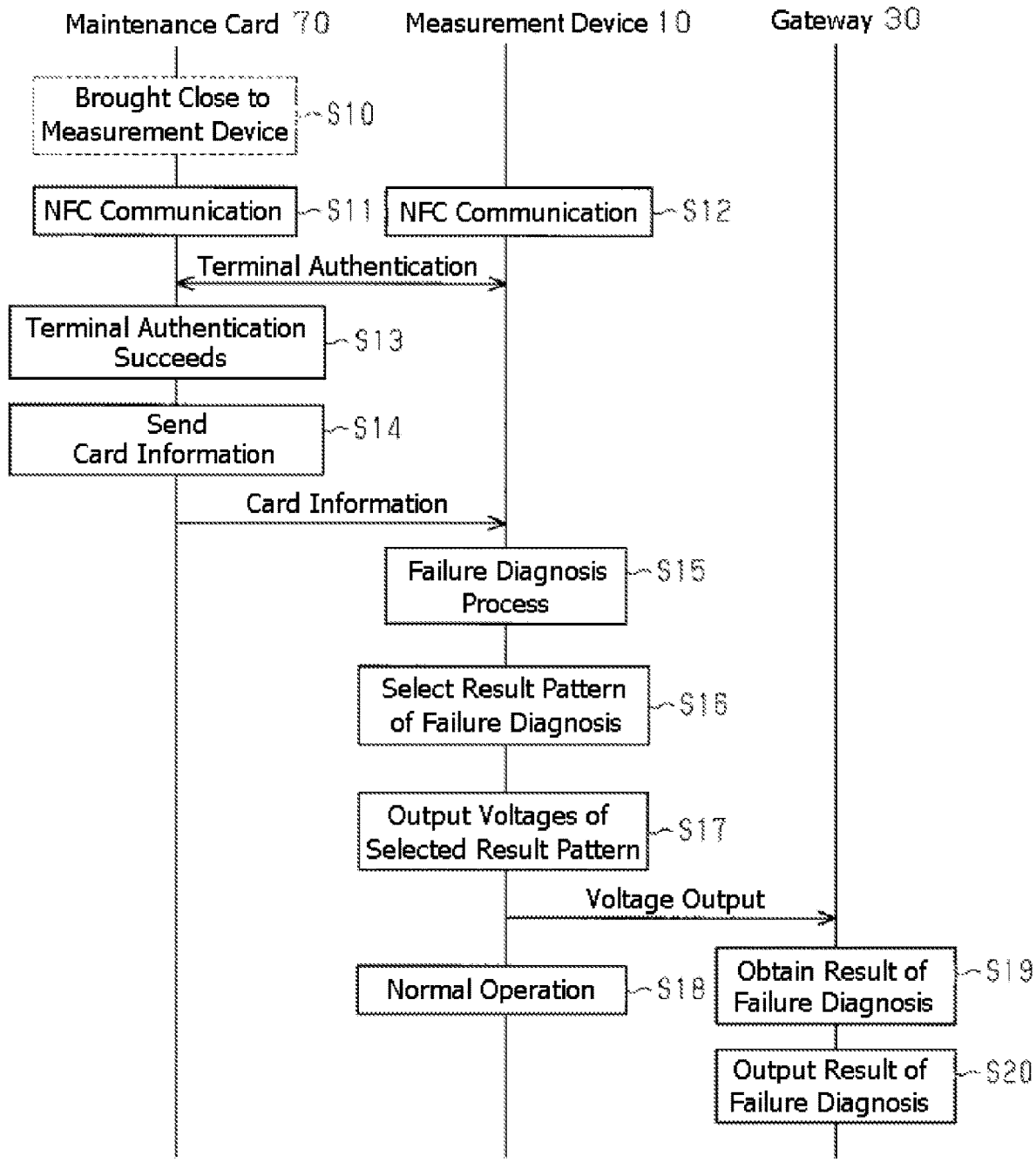
FIG. 6 is a sequence chart showing a process performed by the measurement device of the embodiment.

Next, FIG. 6 is additionally referred to, to describe the operation of the measurement device configured as described above. Failure diagnosis based on the maintenance card 70 will now be described.

As shown in FIG. 5, when the maintenance card 70 is brought close to the measurement device 10 (step S10), the maintenance card 70 and the measurement device 10 perform the NFC (steps S11, S12). That is, the maintenance card 70 performs terminal authentication by the short range wireless communication, and it is confirmed whether the maintenance card 70 is a regular card that is permitted to communicate with the measurement device 10.

When the authentication succeeds (step S13), the maintenance card 70 sends card information to the measurement device 10 (step S14). More specifically, the card information stored on the maintenance card 70 is read out and sent from the NFC 13 to the control unit 12 by the short range wireless communication. Since the maintenance card 70 is a failure diagnosis card, a failure diagnosis request is sent to the measurement device 10 as the card information by the short range wireless communication.

Subsequently, the measurement device 10 receives the card information from the maintenance card 70 by the short range wireless communication and performs a failure diagnosis process based on the card information (step S15). More specifically, the control unit 12 performs the failure diagnosis process included in the card information that the NFC 13 fetched from the maintenance card 70. In the failure diagnosis, the control unit 12 checks whether there is any abnormality in the temperature output circuit, the color information output circuits, the LED, the power source, the photodiode, the temperature sensor, etc., and checks the service temperature, oil penetration, the life of the LED, etc.

Next, the measurement device 10 selects a result pattern of the failure diagnosis obtained by the failure diagnosis process (step S16). More specifically, the diagnosis unit 22 selects the result of the failure diagnosis from the first to twelfth patterns. The measurement device 10 then outputs voltages of the selected result pattern (step S17). More specifically, the diagnosis unit 22 applies voltages to the connection lines C in the selected result pattern, thereby to output to the output lines L the combination of the voltages corresponding to the diagnosis result. After performing the failure diagnosis and outputting the diagnosis result, the measurement device 10 performs the normal measurement process (step S18).

Next, when the combination of the voltages is output from the measurement device 10 through the output lines L, the gateway 30 obtains the result of the failure diagnosis from the combination of the voltages (step S19). More specifically, the gateway 30 can recognize that the input voltages indicate a result of the failure diagnosis because they have different values than those output during the normal measurement operation, and the gateway 30 can grasp the condition of failure from the combination of the voltages. When the gateway 30 grasps the result of the failure diagnosis from the combination of the voltages, the gateway 30 outputs the result of the failure diagnosis (step S20). More specifically, the gateway 30 outputs the result of the failure diagnosis to the network NW, and therefore, it is possible to accumulate the result of the failure diagnosis on the database server 50 connected to the network NW or display the diagnosis result on the mobile terminal 60 connected to the network NW.

Thus, the result of the failure diagnosis is output from the measurement device 10 to the gateway 30 with the combination of the voltages, and therefore, it is possible to output multiple sorts of results of failure diagnosis without providing a signal line for outputting the result of the failure diagnosis.

Figure 7:
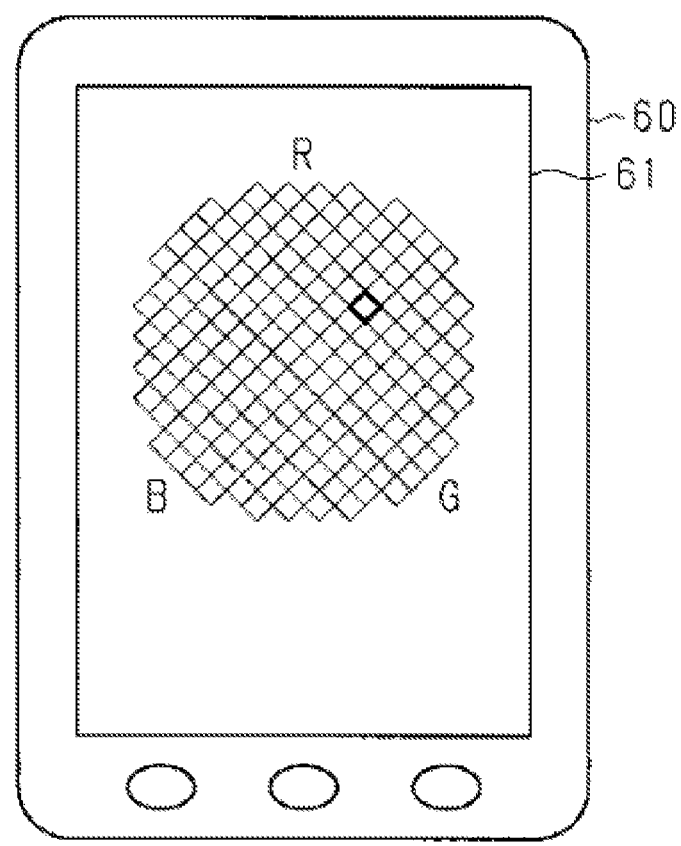
FIG. 7 shows an example of a mobile terminal displaying a measurement result of the measurement device of the embodiment.

Next, the mobile terminal 60 having a display device will now be described. As shown in FIG. 7, the mobile terminal 60 includes a display unit 61 for displaying the result of the sensing. The display unit 61 displays the colors of the measured object sensed by the sensor 11 in a color map. More specifically, the colors of the object are displayed in the color map displayed on the display unit 61, and therefore, a user can grasp the condition of the object intuitively.

The display unit 61 can detect an operation. Further, the display unit 61 displays in a color map the calibrations of the colors of the object sensed by the sensor 11 and displays calibration conditions to be selected by the user. Therefore, the user can make a selection while recognizing the condition of the object intuitively.

According to the above-described embodiment, the following advantageous effects can be produced.

(1) A result of failure diagnosis can be output with the combination of voltages applied to the plurality of output lines L, and therefore, it is possible to output multiple sorts of results of failure diagnosis without providing a signal line for outputting the result of the failure diagnosis.

(2) A result of failure diagnosis can be output using the values usually not used, and therefore, it is possible to output the result of the failure diagnosis without providing an additional signal line for outputting the result of the failure diagnosis.

(3) The combination of the voltages is constituted by the minimum value (0 V) and the maximum value (5 V) of each of the output lines L, and therefore, the number of sorts of the results of the failure diagnosis that can be output is two to the power of the number of the output lines (4) (16 sorts).

(4) The output lines L are used to output color information, and therefore, there is no need of providing an additional line for outputting the result of the failure diagnosis.

(5) The colors of the object sensed by the sensor 11 are displayed in a color map on the display unit 61 of the mobile terminal 60, and therefore, a user can grasp the condition of the object intuitively.

(6) The calibrations of the colors of the object sensed by the sensor 11 are displayed in a color map on the display unit 61 of the mobile terminal 60 for selection by the user, and therefore, a user can grasp the condition of the object intuitively.

The above-described embodiments can be adequately modified as described below.

In the above embodiment, the display unit 61 of the mobile terminal 60 displays the colors of the object sensed by the sensor 11 in a color map along with the calibration conditions to be selected by the user. It is also possible to omit the selection of the calibration conditions.

In the above embodiment, the display unit 61 of the mobile terminal 60 displays in a color map the colors of the object sensed by the sensor 11, but it is also possible to omit the display in a color map.

In the above embodiment, the measurement device 10 outputs to the gateway 30 the temperature information along with the color information, but it is also possible that the output of the temperature information is omitted and the output lines L from the measurement device 10 to the gateway 30 are constituted by three lines. In this case, the number of combinations of the voltages is two to the power of three, and thus eight sorts of diagnosis results can be output.

In the above embodiment, the sensor 11 is a color sensor, but it is also possible to replace the color sensor with any sensor having a plurality of output lines, so as to output a result of failure diagnosis by combinations of the voltages in the output lines in the same manner.

In the above embodiment, the voltages selected during the diagnosis result output operation are outside the range of the voltages output during the normal measurement operation, but it is also possible that those voltages are within the range of the voltages output during the normal measurement operation as long as they can be recognized as voltages indicating the result of the failure diagnosis.

In the above embodiment, the voltages selected during the diagnosis result output operation are the minimum value and the maximum value of the output lines L, but it is also possible that those voltages have any other values than the minimum value and the maximum value of the output lines L that can be recognized as voltages indicating the result of the failure diagnosis.

In the above embodiment, the voltages applied to the output lines L during the diagnosis result output operation have two values (0 V and 5 V), but it is also possible that multiple sorts of voltages are applied to the output lines L. This makes it possible to output V to the power of N sorts of diagnosis results, where V is the number of sorts of applied voltages and N is the number of output lines.

In the above embodiment, the measurement system includes both the mobile terminal 60 and the maintenance card 70, but it is also possible that the measurement system includes only one of the mobile terminal 60 and the maintenance card 70.

In the above embodiment, the mobile terminal 60 or the maintenance card 70 having the update information for the measurement device 10 performs the terminal authentication with the measurement device 10, and if the terminal authentication succeeds, the information on the measurement device 10 is updated. It is also possible to omit the terminal authentication if security is ensured by using the mobile terminal 60 or the maintenance card 70.

In the above embodiment, the measurement results of the measurement device 10 are accumulated on the database server 50, but it is also possible that the database server 50 is omitted and the measurement results are directly fetched from the measurement device 10 with the mobile terminal or the like.

In the above embodiment, the failure diagnosis process is performed based on the maintenance card 70, but this is not limitative, and it is also possible that the failure diagnosis process is performed in parallel with the normal measurement operation. In this case, the output lines L1, L2, L3, and L4 are subjected to the voltages indicating the results of the self-diagnosis only when there is abnormality, and the output lines are subjected to the voltages indicating the color information and the like when there is no abnormality.

The measurement device 10 may include one or more processors that serve as the measurement unit 21 and the diagnosis unit 22. For example, the measurement unit 21 and the diagnosis unit 22 may be a measurement processor and a diagnosis processor, respectively. The measurement device 10 may include a non-transitory computer-readable storage medium that stores instructions or computer programs to be executed by the one or more processors, in addition to or in place of the memory 23. Non-limiting examples of the storage medium include a non-volatile memory, a magnetic disk device including a magnetic disk, and an optical disk device including an optical disk.

The present disclosure encompasses the following implementation example. Not for limitation but for assistance in understanding, the reference signs of the illustrated embodiment are provided. In one or more implementation examples of the present invention, the measurement device (10) comprises: a sensing unit (11) for sensing a condition of an object to be measured; a control unit (12) for performing self-failure diagnosis; and a plurality of output lines (L1 to L4) for outputting the condition of the object sensed by the sensing unit (11) and the result of the self-failure diagnosis from the control unit (12) to outside the measurement device (10), wherein the control unit (12) includes one or more processors (21*a*, 22*a*) configured to generate a set of sensing voltage values corresponding to the condition of the object sensed by the sensing unit (11), each of the sensing voltage values lying in a range from a first voltage value to a second voltage value, apply the generated sensing voltage values to the plurality of output lines (L1 to L4), respectively, generate a set of failure diagnosis voltage values corresponding to the result of the failure diagnosis, at least one of the failure diagnosis voltage values being a third voltage value (0 V or 5 V) outside the above range, and apply the generated failure diagnosis voltage values to the plurality of output lines (L1 to L4), respectively.

In some implementation examples, each of the plurality of failure diagnosis voltage values is outside the predetermined range. It would be apparent to those skilled in the art that the present invention may be embodied in any other forms that do not divert from the technical idea of the present invention. For example, it is possible to omit a part of the elements described in relation to the embodiment (or one or more aspects thereof) or combine such elements. The scope of the present invention should be defined with reference to the attached claims along with the entire scope of the equivalents to which the claims are patented.

LIST OF REFERENCE NUMBERS

10 measurement device
11 sensor
12 control unit
13 NFC
21 measurement unit
22 diagnosis unit
23 memory
30 gateway
50 database server
51 database
60 mobile terminal
61 display unit
70 maintenance card
NW network

What is claimed is:

1. A measurement device, comprising:
   a sensing unit configured to sense a condition of an object to be measured;
   a plurality of output lines for outputting a sensing result of the sensing unit; and
   a control unit configured to apply a plurality of analog voltages to the plurality of output lines, respectively, based on the sensing result of the sensing unit,
   wherein the control unit performs self-failure diagnosis and outputs a result of the self-failure diagnosis with a combination of analog voltages that are generated in accordance with the result of the self-failure diagnosis and are applied to the plurality of output lines, respectively.

2. The measurement device according to claim 1, wherein the combination of the analog voltages is constituted by values outside a range of sensing values output during normal measurement operation.

3. The measurement device according to claim 1, wherein the combination of the analog voltages is constituted by a minimum value and a maximum value of each of the output lines.

4. The measurement device according to claim 1, wherein the sensing unit is configured to sense color of the object, and
   wherein the plurality of output lines correspond respectively to three primary colors of color information obtained by the sensing unit.

5. The measurement device according to claim 1, wherein each of the plurality of analog voltages, which are generated in accordance with the sensing result of the sensing unit, has a voltage value within a predetermined voltage range,
   wherein each of the combination of analog voltages, which are generated in accordance with the result of the self-failure diagnosis, has a voltage value that is one of two fixed voltage values outside the predetermined voltage range.

6. The measurement device according to claim 1, wherein the number of the analog voltages in the combination of analog voltages, which are generated in accordance with the result of the self-failure diagnosis, is equal to the number of the plurality of output lines.

* * * * *